United States Patent
Leclerc et al.

(10) Patent No.: US 6,341,022 B1
(45) Date of Patent: Jan. 22, 2002

(54) OPTICAL FIBER TRANSMISSION SYSTEM USING SOLITON SIGNALS WITH WAVELENGTH DIVISION MULTIPLEXING

(75) Inventors: Olivier Leclerc, Saint Michel sur Orge; Patrick Brindel, Longpont sur Orge, both of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/172,867

(22) Filed: Oct. 15, 1998

(30) Foreign Application Priority Data

Oct. 16, 1997 (FR) .................................. 97 12985

(51) Int. Cl.[7] .............................................. H04J 14/02
(52) U.S. Cl. ........................ 359/124; 359/158; 359/173
(58) Field of Search ................................ 359/158, 188, 359/181, 161, 124, 127, 173, 133

(56) References Cited

U.S. PATENT DOCUMENTS

| | | | | |
|---|---|---|---|---|
| 5,548,433 A | * | 8/1996 | Smith ........................... | 359/158 |
| 5,608,560 A | * | 3/1997 | Abram et al. ................ | 359/156 |
| 5,642,215 A | * | 6/1997 | Suzuki et al. ................ | 359/161 |
| 5,684,615 A | * | 11/1997 | Blow et al. ................... | 359/173 |
| 5,801,862 A | * | 9/1998 | Desurvire et al. ........... | 359/124 |
| 6,122,088 A | * | 9/2000 | Hasewaga ..................... | 359/188 |
| 6,147,788 A | * | 11/2000 | Mamyshev et al. ......... | 359/173 |
| 6,160,650 A | * | 12/2000 | Bigo et al. .................... | 359/124 |
| 6,175,435 B1 | * | 1/2001 | Watanabe ..................... | 359/161 |

FOREIGN PATENT DOCUMENTS

EP        0 786 877 A1        7/1997

OTHER PUBLICATIONS

M. Nakazawa et al, "100 Gbit/s WDM 290 Gbit/s*5 channels) soliton transmission over 10000 km using inline synchronous modulation and optical filtering", Electronics Letters, vol. 33, No. 14, Jul. 3, 1997, Stevenage GB, pp. 1233–1234.

* cited by examiner

*Primary Examiner*—Leslie Pascal
(74) *Attorney, Agent, or Firm*—Sughrue Mion, PLLC

(57) ABSTRACT

The invention relates to an optical fiber transmission system using soliton signals with wavelength division multiplexing in which the wavelengths, $\lambda_1$ to $\lambda_n$, of the various channels of the multiplex are selected in such a manner that at least one point of the transmission system, the difference between the bit times of any two channels of the multiplex is substantially a submultiple T/N of the clock period. The invention proposes placing a synchronous modulator at said point to modulate the soliton signals at a frequency N/T which is a multiple of the soliton clock frequency 1/T. In a frequency allocation scheme that ensures that the bit times of the channels are synchronous at an interval ZR, this makes it possible to modulate all of the channels at intervals that are submultiples of $Z_R$ by using modulation frequencies that are multiples of the clock frequency.

21 Claims, 1 Drawing Sheet

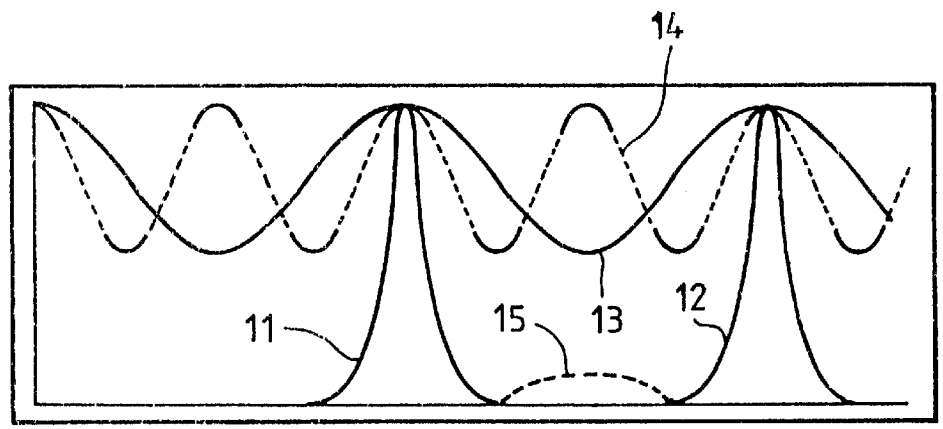
FIG_1
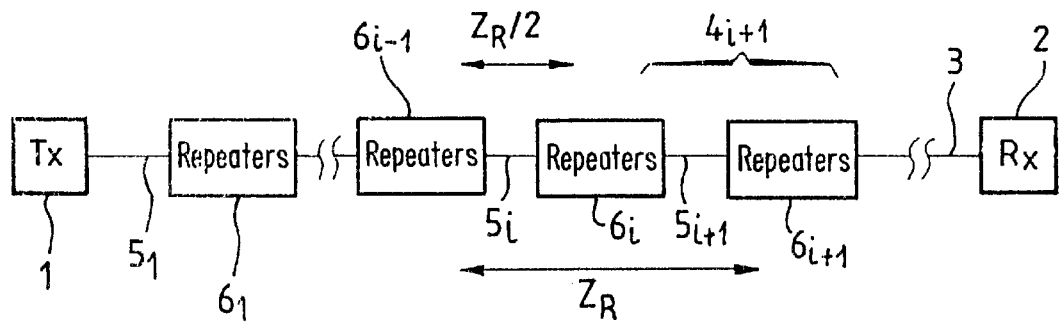
FIG_2

OPTICAL FIBER TRANSMISSION SYSTEM USING SOLITON SIGNALS WITH WAVELENGTH DIVISION MULTIPLEXING

FIELD OF THE INVENTION

The present invention relates to an optical fiber transmission system using soliton signals with wavelength division multiplexing in which the various wavelengths of the multiplex are selected so as to ensure that over a given interval the relative slip between the various channels is substantially equal to a multiple of the bit time.

The invention also relates to a method of transmission in such a system.

BACKGROUND OF THE INVENTION

The transmission of soliton pulses or "solitons" in the portion of an optical fiber that has abnormal dispersion is a known phenomenon. Solitons are pulse signals having a $sech^2$ waveform. With pulses of this waveform, the non-linearity in the corresponding portion of the fiber compensates dispersion of the optical signal. Soliton transmission is modelled in known manner by the non-linear Schrödinger equation.

Various effects limit the transmission of such pulses, such as the jitter induced by solitons interacting with the noise present in the transmission system, as described for example in the article by J. P. Gordon and H. A. Haus, in Optical Letters, Vol. 11, No. 10, pp. 665–667. This effect which is known as the "Gordon-Haus effect" or as "Gordon-Haus jitter" puts a theoretical limit on the quality or on the bit rate of transmission by solitons.

In order to be able to exceed that limit, it is possible to use synchronous modulation of soliton signals with the help of semiconductor modulators. That technique intrinsically limits the bit rate of the soliton link because of the upper limit on the passband of semiconductor modulators. Proposals have therefore been made for sliding guiding filter systems that make it possible to control the jitter of transmitted solitons, see for example EP-A-0 576 208. For the purposes of regenerating the signal on the line, proposals have also been made to use the Kerr effect in synchronous amplitude or phase modulators. Finally, proposals have been made to use saturable absorbers to regenerate soliton signals.

For the purpose of increasing the bit rate of optical fiber transmission systems using soliton signals, proposals have also been made to use wavelength division multiplexing (WDM). Under such circumstances, it is considered advantageous to use sliding guiding filters of the Fabry-Perot type which are fully compatible with wavelength division multiplexed signals. In contrast, the use of synchronous modulators or of saturateable absorbers for regenerating wavelength division multiplexed soliton signals is problematic because of the differences in the group velocities of the signals in the various channels.

An article by E. Desurvire, O. Leclerc, and O. Audouin, published Optics Letters, Vol. 21, No. 14, pp. 1026–1028, describes a scheme for allocating wavelengths which is compatible with using synchronous modulators. That article proposes allocating wavelengths to the different channels of the multiplex in such a manner that for given intervals $Z_R$ between repeaters, the signals in the various channels, or more exactly the bit times of the various channels of the multiplex, are substantially synchronized on arrival at the repeaters. This makes in-line synchronous modulation of all of the channels possible at given intervals with the help of discrete synchronous modulators. That technique for allocation the wavelengths of the multiplex is also described in French patent application No. 96/00732 of Jan. 23, 1996 in the name of Alcatel Submarine Networks. In the article, it is proposed to select a subgroup of channels that are synchronous not only at intervals $Z_R$, but also at intervals that are submultiples of $Z_R$.

Another article by O. Leclerc, E. Desurvire, and O. Audouin, published in Optical Fiber Technology, 3, pp. 97–116 (1997) specifies that the above wavelength allocation scheme can give rise to intervals $Z_R$ between synchronous modulators that are too great, or to spacing between channels in the multiplex that are too great. To mitigate that problem, the article observes that in such a wavelength allocation scheme, the bit times of subsets of the channels to be multiplexed are synchronized at intervals that are submultiples of $Z_R$. Consequently, the article proposes regenerating subsets of the channels in the multiplex at shorter intervals.

Nevertheless, that solution requires the channels of the subset that is to be regenerated to be filtered out, and it causes the transmission system to lose its unique periodicity for all of the channels.

OBJECTS AND SUMMARY OF THE INVENTION

The present invention proposes a solution to the problem of synchronous modulation of wavelength division multiplexed soliton signals that is original and simple. It makes it possible to avoid the drawbacks mentioned above. The invention enables all of the channels in the multiplex to be modulated simultaneously.

More precisely, the invention provides an optical fiber transmission system using soliton signals with wavelength division multiplexing having a clock period T, in which the wavelengths, $\lambda_1$ to $\lambda_n$, of the various channels of the multiplex are selected in such a manner that at least at one point in the transmission system, the difference between the bit times of any two channels of the multiplex is substantially equal to a fraction $kT/N$ of the clock period, where k is an integer, the system including, at least at said point, a synchronous modulator for modulating the soliton signals at a frequency $N/T$ which is a multiple of the soliton clock frequency $1/T$.

Advantageously, the wavelengths $\lambda_1$ to $\lambda_n$, of the various channels of the multiplex are selected so that at a plurality of points of the transmission system that are spaced apart by an interval $Z_R$, the difference between the bit times of any two channels of the multiplex is substantially equal to a fraction $kT/N$ of the clock period, the system including, at each of said points, a synchronous modulator for modulating the soliton signals at a frequency $N/T$ which is a multiple of the soliton clock frequency $1/T$.

In an embodiment, the wavelengths, $\lambda_1$ to $\lambda_n$, of the various channels of the multiplex are selected in such a manner that at least at one other point of the transmission system, the difference between the bit times of any two channels of the multiplex is substantially equal to the clock period T, the system including, at said at least one other point, a synchronous modulator for modulating the soliton signals at the soliton clock frequency $1/T$.

Preferably, the wavelengths, $\lambda_1$ to $\lambda_n$, of the various channels of the multiplex are selected in such a manner that at a plurality of other points of the transmission system spaced apart by an interval $Z_R$, the difference between the bit times of any two channels of the multiplex is substantially equal to the clock period T, the system including at each of said other points a synchronous modulator for modulating the soliton signals at the soliton clock frequency 1/T.

In an embodiment, at said point or at each of said points, the difference $d_i$ between the bit times of a channel of wavelength $\lambda_i$ of the multiplex and of the first channel of wavelength $\lambda_1$ satisfies the relationship:

$$|d_i - k_i \cdot T/N| < T/4$$

where $k_i$ is an integer depending on the channel.

Advantageously, at said other point or at each of said other points, the difference $d_i$ between the bit times of a channel of wavelength $\lambda_i$ of the multiplex and of the first channel of wavelength $\lambda_1$ satisfies the relationship:

$$|d_i| < T/4$$

Provision can also be made to ensure that for each wavelength $\lambda_i$ of the multiplex, and for an interval $Z_R$, the difference $\Delta\tau_i$ between the slip per unit length on channel i and on the first channel to satisfies the following relationship:

$$(k_i \cdot T/4) < \Delta\tau_i \cdot Z_R < (k_i \cdot T + T/4)$$

where $k_i$ is an integer depending on the channel.

When the system is a system without dispersion slope compensation, the wavelengths, $\lambda_1$ to $\lambda_n$, of the various channels of the multiplex are advantageously selected so that for an interval $Z_R$:

$$(k_i \cdot T - T/4) < D'_0 \cdot \Delta\lambda_{i1} \cdot (\Delta\lambda_{i1} + 2 \cdot \Delta\lambda_{10}) \cdot Z_R/2 < (k_i \cdot T + T/4)$$

where:
$k_i$ is an integer depending on the channel;
$D'_0$ is the dispersion slope;
$\delta\lambda_{i1}$ is the wavelength difference between channels i and 1; and
$\Delta\lambda_{10}$ is the wavelength difference between the first channel and the wavelength $\lambda_0$ having zero dispersion.

If the system is a system having dispersion slope compensation, then the wavelengths, $\lambda_1$ to $\lambda_n$, of the various channels of the multiplex are preferably selected so that for an interval, $Z_R$:

$$(k_i \cdot T - T/4) < D_m \cdot \Delta\lambda_{i1} \cdot Z_R/2 < (k_i \cdot T + T/4)$$

where:
$k_i$ is an integer depending on the channel;
$D_m$ is the mean dispersion slope for wavelengths $\lambda_1$ to $\lambda_n$; and
$\Delta\lambda_{i1}$ is the wavelength difference between channels i and 1.

In an embodiment, said modulator at the frequency N/T is an intensity modulator of modulation depth that is selected so as to compensate the effects of modulation at the frequency N/T on modulation depth compared with a modulator operating at the frequency 1/T.

In another embodiment, said modulator at the frequency N/T is an intensity modulator having modulation depth selected so as to compensate for the effects of modulation at the frequency N/T on modulation depth compared with a modulator operating at the frequency 1/T, which effects are expressed by the following formula:

$$IM_N = 20 \cdot \log(N) - 10 \cdot \log[N^2 - 1 + 10^{IM_1/10}]$$

where:
$IM_N$ is the modulation depth of the modulator at the frequency N/T; and
$IM_1$ is the modulation depth of the modulator at the frequency 1/T.

The invention also provides a method of transmitting soliton signals in an optical fiber system with wavelength division multiplexing, in which the bit times of the various channels $\lambda_1$ to $\lambda_n$ of the multiplex are selected in such a manner that at least one point of the transmission system, the difference between the bit times of any two channels of the multiplex is substantially a submultiple T/N of the substantially synchronous clock period at least one point, the method including at least one step of synchronously regenerating the signals of the channels of the multiplex at said point by synchronous modulation at a frequency N/T which is a multiple of the soliton clock frequency 1/T.

Preferably, the wavelengths, $\lambda_1$ to $\lambda_n$, of the various channels of the multiplex are selected in such a manner that at a plurality of points of the transmission system that are spaced apart by an interval $Z_R$, the difference between the bit times of any two channels of the multiplex is substantially equal to a submultiple T/N of the clock period, the method comprising a plurality of steps of synchronously regenerating the signals of the channels in the multiplex at each of said points by synchronous modulation at a frequency N/T which is a multiple of the soliton clock frequency 1/T.

Advantageously, the wavelengths, $\lambda_1$ to $\lambda_n$, of the various channels of the multiplex are selected in such a manner that at least one other point of the transmission system, the difference between the bit times of any two channels of the multiplex is substantially equal to the clock period T, the method comprising a step of synchronously regenerating the signals of the channels of the multiplex at said at least one other point by synchronous modulation at the soliton clock frequency 1/T.

It is possible to select the wavelengths $\lambda_1$ to $\lambda_n$ of the various channels of the multiplex so that the difference between the bit times of any two channels of the multiplex is substantially equal to the clock period T at a plurality of other points of the transmission system remote from any interval $Z_R$, the method comprising a plurality of steps of synchronously regenerating the signals of channels in the multiplex at each of said other points by synchronous modulation at the soliton clock frequency 1/T.

It is also possible to select the wavelengths $\lambda_1$ to $\lambda_n$ of the various channels of the multiplex in such a manner that at said point or at each of said points, the difference $d_i$ between the bit time of a channel of wavelength $\lambda_i$ of the multiplex and of the first channel of wavelength $\lambda_1$ satisfies the relationship:

$$|d_i - k_i \cdot T/N| < T/4$$

where $k_i$ is an integer depending on the channel.

Preferably, the wavelengths, $X_1$ to $\lambda_n$, of the various channels of the multiplex are selected in such a manner that at said other point or at each of said other points, the difference $d_i$ between the bit times of a channel of wavelength $\lambda_i$ of the multiplex and of the first channel of wavelength $\lambda_1$ satisfies the relationship:

$$|d_i| < T/4$$

Advantageously, the wavelengths, $\lambda_1$ to $\lambda_n$, of the various channels of the multiplex are selected in such a manner that for all of the wavelengths $\lambda_i$ of the multiplex, and for an interval $Z_R$, the difference $\Delta\tau_i$ between the slip per unit length on channel i and on the first channel satisfies the relationship:

$$(k_i \cdot T - T/4) < \Delta\tau_i \cdot Z_R < (k_i \cdot T + T/4)$$

where $k_i$ is an integer depending on the channel.

If the system is a system without dispersion slope compensation, the wavelengths $\lambda_1$ to $\lambda_n$ of the various channels of the multiplex are preferably selected so that for an interval $Z_R$:

$$(k_i \cdot T - T/4) < D'_0 \cdot \Delta\lambda_{i1} \cdot (\Delta\lambda_{i1} + 2 \cdot \Delta\lambda_{10}) \cdot Z_R / 2 < (k_i \cdot T + T/4)$$

where:

$k_i$ is an integer depending on the channel;

$D'_0$ is the dispersion slope;

$\Delta\lambda_{i1}$ is the wavelength difference between channels i and 1; and $\Delta\lambda_{10}$ is the wavelength difference between the first channel and the wavelength $\lambda_0$ at which dispersion is zero.

If the system is a system with dispersion slope compensation, the wavelengths $\lambda_1$ to $\lambda_n$ of the various channels of the multiplex are advantageously selected so that for an interval $Z_R$:

$$(k_i \cdot T - T/4) < D_m \cdot \Delta\lambda_{i1} \cdot Z_R < (k_i \cdot T + T/4)$$

where:

$k_i$ is an integer depending on the channel;

$D_m$ is the mean dispersion slope for the wavelengths $\lambda_i$ to $\lambda_n$; and $\Delta\lambda_{i1}$ is the wavelength difference between channels i and 1.

In an embodiment, the synchronous modulation at the frequency N/T is intensity modulation with modulation depth selected to compensate the effects of modulation at the frequency N/T on modulation depth compared with a modulator operating at the frequency 1/T, said effects being expressed by the following formula:

$$IM_N = 20 \cdot \log(N) - 10 \cdot \log[N^2 - 1 + 10^{IM_1/10}]$$

where:

$IM_N$ is the modulation depth of the modulator at the frequency N/T; and $IM_1$ is the modulation depth of the modulator at the frequency 1/T.

BRIEF DESCRIPTION OF THE DRAWING

Other characteristics and advantages of the invention appear on reading the following description of embodiments of the invention given by way of example and with reference to the accompanying drawing, in which:

FIG. 1 is a diagram of a transmission system constituting a first embodiment of the invention; and FIG. 2 shows a transmission system of the invention.

MORE DETAILED DESCRIPTION

The invention applies to an optical fiber transmission system using soliton signals with wavelength division multiplexing in which the various wavelengths of the multiplex are selected to ensure that the relative slip between the various channels is substantially equal to a multiple of the bit time over a given interval. For this purpose, it is possible to use the wavelength allocation schemes described in the above-mentioned articles by E. Desurvire and O. Leclerc. Those articles are incorporated into the present description by reference insofar as they relate to wavelength allocation schemes.

Such a wavelength allocation scheme ensures that, at regular intervals $Z_R$ along the fiber, the relative slip between the various channels is substantially equal to a multiple of the bit time. For each channel, this can be expressed by the following formula:

$$(k_i \cdot T - T/4) < \Delta\tau_i \cdot Z_R < (k_i \cdot T + T/4)$$

where T is the bit time, $k_i$ is an integer depending on the channel, and $\Delta\tau_i$ is the slip of channel i relative to channel 1. This formula represents the fact that at intervals $Z_R$ the offsets between the various channels caused by the slip are, to within one-fourth a bit time, integer multiples of the bit time. This ensures exact or almost exact coincidence of bit times at an interval of $Z_R$, insofar as the bit times coincide exactly or almost exactly on transmission.

The problem with such wavelength allocation schemes, as explained above, is the distance between the points at which the channels are synchronous. The above-mentioned article by E. Desurvire gives the following example for a non-dispersion-slope compensated system (a non-DSC system): for a 10 Gbit/s WDM with a bit time $T_{bit}$ of 100 ps, an interchannel spacing $\Delta\lambda = 1$ nm, and a dispersion slope $D'_0 = 7 \times 10^{-2}$ ps/nm²·km, the interval $Z_R$ between points of synchronism is 1428.6 km. Conversely, the corresponding formulae shows that for a 10 Gbit/s WDM with a bit time $T_{bit}$ of 100 ps, if the interval $Z_R$ is set at 100 km, then:

for a non-DSC system with $D'_0 = 7 \times 10^{-2}$ ps/nm²·km, the interchannel spacing $\Delta\lambda = 3.8$ nm; or for a DSC system with $<D> = 0.4$ ps/nm.km, the interchannel spacing $\Delta\lambda = 2.5$ nm.

In one case the interval $Z_R$ is too long; while in the other the interchannel spacing is too large for a wavelength division multiplex. The scheme of the above-mentioned article by E. Desurvire does not provide a solution to this problem while the solution provided in the article by O. Leclerc requires filtering.

The invention provides a solution to these problems. It relies on the fact that soliton signals can be modulated synchronously not only with the help of a modulation signal at the bit frequency or clock frequency of the solitons, but also with the help of a modulation signal that is at a frequency which is a multiple of said clock frequency. By way of example, FIG. 1 is a graph of power as a function of time showing two solitons 11 and 12. Solid line signal 13 is a modulation signal at the clock frequency 1/T, while dashed line signal 14 is a modulation signal at a frequency 2/T which is twice the clock frequency. The signal at the frequency 2/T modulates the solitons, with the effect of modulation by means of the signal at the frequency 2/T on noise being represented by dashed line 15.

This amount of noise accumulation can be accepted. In addition, when modulation at the frequency 1/T is provided at least once every N repeaters, as explained below, this noise is eliminated by the modulation at 1/T.

Such modulation makes it possible to modulate signals that are offset not only by one clock period, but also by signals that are offset by a submultiple of the clock period.

Consequently, the invention proposes modulating the various channels of the multiplex at a frequency which is a multiple of the clock frequency. This makes it possible to modulate the solitons in all of the channels at intervals that are shorter than $Z_R$ without it being necessary to filter out channels. In a wavelength allocation scheme of the kind described above, this assumes merely that modulation is performed at a frequency N/T which is a multiple of the soliton clock frequency 1/T at a point where the difference between the bit times of any two channels in the multiplex is substantially a fraction kT/N of the clock period.

FIG. 2 shows a first embodiment of a transmission system of the invention for the simplest case where N=2. The transmission system of FIG. 2 comprises a transmitter 1, a receiver 2 connected to a segment of fiber 3, and n segments $4_i$, where i=1 to p. The transmitter 1 transmits soliton pulses into the first segment for which i=1, and it does so in the various channels of a wavelength division multiplex using wavelengths $\lambda_1$ to $\lambda_n$. The various wavelengths are selected using a frequency allocation scheme that ensures that the relative slip between the various channels is substantially equal to a multiple of the bit time over a given interval $Z_R$. The last segment for which i=p is connected to the fiber 3 which conveys the soliton pulses to the receiver 2.

Each segment $4_i$ has a length of fiber $5_i$ whose outlet is connected to a repeater $6_i$. The outlet of the repeater is connected to the fiber $5_{i+1}$ of the following segment, or in the case of the last segment of index p, to the fiber 3. The length of each segment corresponds to the interval $Z_R/N$, i.e. $Z_R/2$ in the case shown in FIG. 2, so as to be able to perform modulation at the end of each segment, should that be necessary.

Each repeater includes a synchronous modulator which modulates all of the channels of the multiplex. As is clear to the person skilled in the art, a repeater can include amplifiers or filters. In particular, any known type of amplifier can be provided, for example a doped fiber amplifier such as an erbium-doped fiber amplifier (EFDA).

On reaching the first repeater $6_i$, i=1, after travelling $Z_R/2$, the signals of the various channels in the multiplex have been subjected to different amounts of slip. The wavelength allocation scheme chosen is such that the bit times of the various channels are either substantially synchronous or else offset by one-half of a clock period T/2.

This can be expressed by means of the following relationship:

$$|d_i|<T/4 \text{ or } |d_j-T/2|<T/4$$

where $d_i$ is the difference $d_i$ between the bit times of a channel of wavelength $\lambda_i$ in the multiplex and the first channel of wavelength $X_1$. This relationship means that to within T/4, the bit times of the various channels are either synchronous or else offset by T/2. This difference of T/4 is small enough to avoid disturbing the modulation.

The above condition can be expressed by the difference $\Delta\tau_i$ between the slip per unit length on channel i and the first channel, as follows:

$$(k_i \cdot T-T/4)<\Delta\tau_i \cdot Z_R<(k_i \cdot T+T/4)$$

where $k_i$ is an integer depending on the channel.

It is clear that in this case, after travelling over an interval of $Z_R/2$, the bit times of the various channels are either synchronized or else offset by T/2.

In the first repeater, the signals of the various channels are modulated by a modulator at the frequency 2/T. This modulator modulates all of the channels together, and there is no need to separate the channels from one another.

On reaching the second repeater $6_i$, i=2, after travelling $Z_R$, the signals of the various channels of the multiplex have been subjected to different amounts of slip. The wavelength allocation scheme selected means that the bit times of the various channels are then substantially synchronous. It is thus possible in the second repeater to perform modulation at a frequency 1/T.

This can be repeated, with each odd numbered repeater performing synchronous modulation at the frequency 2/T and each even numbered repeater performing synchronous modulation at the frequency 1/T.

By analogy, it is possible to provide repeaters that are spaced apart by $Z_R/N$ and to use synchronous modulators at the frequency N/T in repeaters of index i that is not a multiple of N, and to use synchronous modulators at the frequency 1/T in repeaters of index i that is a multiple of N. Thus, for N=3, it will be possible to have a succession of groups comprising two repeaters operating at 3/T and one repeater at 1/T.

It is also clear that the modulation frequency can be less than N/T in some cases. Thus, for N=4, the modulation frequency after a distance $k \cdot Z_R + Z_R/4$ or after a distance $k \cdot Z_R + 3Z_R/4$ is 4/T. After a distance $k \cdot Z_R + Z_R/2$ modulation can be performed at a frequency of 2/T. After a distance of $k \cdot Z_R$ it is possible to modulate at a frequency of 1/T.

The modulation can be performed by any means known to the person skilled in the art.

The conditions for the various channels to be synchronous can be expressed as follows in a transmission system with or without dispersion slope compensation.

In a system without dispersion slope compensation, the condition can be written:

$$(k_i \cdot T-T/4)<D'_0 \cdot \Delta\lambda_{i1} \cdot (\Delta\lambda_{i1}+2 \cdot \Delta\lambda_{10}) \cdot Z_R/2 <(k_i \cdot T+T/4)$$

or, using the notation Z for the interval $Z_R/N$ between possible repeater positions:

$$(k_i \cdot T/N-T/4)<D'_0 \cdot \Delta\lambda_{i1} \cdot (\Delta\lambda_{i1}+2 \cdot \Delta\lambda_{10}) \cdot Z/2 <(k_i \cdot T/N+T/4)$$

where:
$k_i$ is an integer that depends on the channel;
$D'_0$ is the dispersion slope;
$\Delta\lambda_{i1}$ is the wavelength difference between channels i and 1; and
$\Delta\lambda_{10}$ is the wavelength difference between the first channel and the wavelength $\lambda_0$ at which dispersion is zero.

In a system with dispersion slope compensation, this condition is written as follows:

$$(k_i \cdot T-T/4)<D_m \cdot \Delta\lambda_{i1} \cdot Z_R/2 <(k_i \cdot T+T/4)$$

and using the notation Z for the interval $Z_R/N$ between possible repeater positions:

$$(k_i \cdot T/N-T/4)<D_m \cdot \Delta\lambda_{i1} \cdot Z/2 <(k_i \cdot T/N+T/4)$$

where:
$k_i$ is an integer depending on the channel;
$D_m$ is the mean dispersion slope for the wavelengths in the range $\lambda_1$ to $\lambda_n$; and
$\Delta\lambda_{i1}$ is the wavelength difference between channels i and 1.

Under such conditions it is possible to place the channels of the multiplex in satisfactory manner. In the example of FIG. 1, for N=2, it is possible to select a 10 Gbit/s WDM with a bit time $T_{bit}$ of 100 ps, an interval Z between repeaters of 100 km ($Z_R=2 \cdot Z=200$ km) and obtain:

for a non-DSC system, with $D'_0=7\times10^{-2}$ ps/nm$^2$·km, an interchannel spacing $\Delta\lambda=2.68$ nm with $\Delta\lambda_{10}=1.34$ nm; or else for a DSC system, with <D>=0.4 ps/nm·km, an interchannel spacing of $\Delta\lambda$=1.25 nm.

The invention makes it economically possible to provide a transmission system with a short regeneration pitch, e.g. about 100 km, thereby providing effective control over transmission quality.

When a signal is intensity modulated, the effect of the modulation is a function of the curvature of the modulation signal, see for example H. Kubota and M. Nakazama, Soliton Transmission Control in Time and Frequency Domains, IEEE Journal of Quantum Electronics, Vol. 29, No. 7, July 1993, pp. 2189 et seq. Compared with a modulator using a sinusoidal modulation signal at the frequency 1/T, the modulation amplitude of a modulator using a sinusoidal signal at the frequency N/T and of the same amplitude is given by:

$$IM_N = 20 \cdot \log(N) - 10 \cdot \log[N^2 - 1 + 10^{IM_1/10}]$$

where:

$IM_N$ is the depth of modulation of the modulator at the frequency N/T; and $IM_1$ is the depth of modulation of the modulator at the frequency 1/T.

The invention thus proposes compensating the effect of the increase in the frequency of the modulation signal on the depth of modulation. Thus, different depths of modulation are advantageously selected for the modulators at the frequency 1/T and at the frequency N/T, such that the effects of modulation on soliton signals are the same.

When N=2, supposing that a depth of modulation $IM_1$ of 10 dB is selected for the even numbered modulators of FIG. 2 (modulators at the frequency 1/T), then it is advantageous to select a depth of modulation of 1.1 dB for the modulators at the frequency 2/T so as to compensate for the effects of increasing the modulation frequency.

Naturally, the present invention is not limited to the examples and embodiments described and shown, and it can be varied in numerous ways by the person skilled in the art. Thus, it is clearly possible to use synchronous modulation at the frequency N/T in all of the repeaters. It is also possible to make use of modulation in some of the repeaters only.

The wavelength allocation scheme is not limited to the examples described. It should also be observed that compared with the embodiments described, it is possible to add or remove filters or amplifiers as a function of requirements. Finally, the invention is described solely for the case of one-way transmission. Clearly the invention also applies to both-way transmission.

What is claimed is:

1. An optical fiber transmission system using soliton signals with wavelength division multiplexing having a clock period T, in which the wavelengths, $\lambda_1$ to $\lambda_n$, of the various channels of the multiplex are selected in such a manner that at least at one point in the transmission system, the difference between the bit times of any two channels of the multiplex is substantially equal to a fraction kT/N of the clock period, where k and N are integers, the system including, at least at said point, a synchronous modulator for modulating the soliton signals at a frequency N/T which is a multiple of the soliton clock frequency 1/T.

2. A transmission system according to claim 1, wherein the wavelengths $\lambda_i$ to $\lambda_n$, of the various channels of the multiplex are selected so that at a plurality of points of the transmission system that are spaced apart by an interval $Z_R$, the difference between the bit times of any two channels of the multiplex is substantially equal to a fraction kT/N of the clock period, the system including, at each of said points, a synchronous modulator for modulating the soliton signals at a frequency N/T which is a multiple of the soliton clock frequency 1/T.

3. A transmission system according to claim 1, wherein the wavelengths, $\lambda_i$ to $\lambda_n$, of the various channels of the multiplex are selected in such a manner that at least at one other point of the transmission system, the difference between the bit times of any two channels of the multiplex is substantially equal to the clock period T, the system including, at said at least one other point, a synchronous modulator for modulating the soliton signals at the soliton clock frequency 1/T.

4. A transmission system according to claim 3, wherein at said other point or at each of said other points, the difference $d_i$ between the bit times of a channel of wavelength $\lambda_i$ of the multiplex and of the first channel of wavelength $\lambda_1$ satisfies the relationship:

$$|d_i| < T/4.$$

5. A transmission system according to claim 1, wherein at said point or at each of said points, the difference $d_i$ between the bit times of a channel of wavelength $\lambda_i$ of the multiplex and of the first channel of wavelength $\lambda_1$ satisfies the relationship:

$$|d_i - k_i \cdot T/N| < T/4$$

where $k_i$ is an integer depending on the channel.

6. A transmission system according to claim 1, wherein the wavelengths, $\lambda_1$ to $\lambda_n$, of the various channels of the multiplex are selected in such a manner that at a plurality of other points of the transmission system spaced apart by an interval $Z_R$, the difference between the bit times of any two channels of the multiplex is substantially equal to the clock period T, the system including at each of said other points a synchronous modulator for modulating the soliton signals at the soliton clock frequency 1/T.

7. A transmission system according to claim 1, wherein for each wavelength $\lambda_i$ of the multiplex, and for an interval $Z_R$, the difference $\Delta\delta_i$ between the slip per unit length on channel i and on the first channel satisfies the following relationship:

$$(k_i \cdot T - T/4) < \Delta\tau_i \cdot Z_R < (k_i \cdot T + T/4)$$

where $k_i$ is an integer depending on the channel.

8. A transmission system according to claim 1, wherein the system is a system without dispersion slope compensation, and wherein the wavelengths, $\lambda_1$ to $\lambda_n$, of the various channels of the multiplex are selected so that for an interval $Z_R$:

$$(k_i \cdot T - T/4) < D'_0 \cdot \Delta\lambda_{i1} \cdot (\Delta\lambda_{i1} + 2 \cdot \Delta\lambda_{10}) \cdot Z_R/2 < (k_i \cdot T + T/4)$$

where:

$k_i$ is an integer depending on the channel;

$D'_0$ is the dispersion slope;

$\Delta\lambda_{i1}$ is the wavelength difference between channels i and 1; and $\Delta\lambda_{10}$ is the wavelength difference between the first channel and the wavelength $\lambda_0$ having zero dispersion.

9. A transmission system according to claim 1, wherein the system is a dispersion slope compensation system, and in that the wavelengths, $\lambda_1$ to $\lambda_n$, of the various channels of the multiplex are selected so that for an interval $Z_R$:

$$(k_i \cdot T - T/4) < D_m \cdot \Delta\lambda_{i1} \cdot Z_R/2 < (k_i \cdot T + T/4)$$

where:
   $k_i$ is an integer depending on the channel;
   $D_m$ is the mean dispersion slope for wavelengths $\lambda_1$ to $\lambda_n$; and
   $\Delta\lambda_{i1}$ is the wavelength difference between channels i and 1.

10. A system according to claim 1, wherein said modulator at the frequency N/T is an intensity modulator of modulation depth that is selected so as to compensate the effects of modulation at the frequency N/T on modulation depth compared with a modulator operating at the frequency 1/T.

11. A system according to claim 1, wherein said modulator at the frequency N/T is an intensity modulator having modulation depth selected so as to compensate for the effects of modulation at the frequency N/T on modulation depth compared with a modulator operating at the frequency 1/T, which effects are expressed by the following formula:

$$IM_N = 20 \cdot \log(N) - 10 \cdot \log[N^2 - 1 + 10^{IM_1/10}]$$

where:
   $IM_N$ is the modulation depth of the modulator at the frequency N/T; and
   $IM_1$ is the modulation depth of the modulator at the frequency 1/T.

12. A method of transmitting soliton signals in an optical fiber system with wavelength division multiplexing, in which the bit times of the various channels $\lambda_i$ to $\lambda_n$ of the multiplex are selected in such a manner that at least one point of the transmission system, the difference between the bit times of any two channels of the multiplex is substantially a submultiple T/N of the substantially synchronous clock period at least one point,
   the method including at least one step of synchronously regenerating the signals of the channels of the multiplex at said point by synchronous modulation at a frequency N/T which is a multiple of the soliton clock frequency 1/T.

13. A transmission method according to claim 12, wherein the wavelengths, $\lambda_i$ to $\lambda_n$, of the various channels of the multiplex are selected in such a manner that at a plurality of points of the transmission system that are spaced apart by an interval $Z_R$, the difference between the bit times of any two channels of the multiplex is substantially equal to a submultiple T/N of the clock period,
   the method comprising a plurality of steps of synchronously regenerating the signals of the channels in the multiplex at each of said points by synchronous modulation at a frequency N/T which is a multiple of the soliton clock frequency 1/T.

14. A transmission method according to claim 12, wherein the wavelengths, $\lambda_i$ to $\lambda_n$, of the various channels of the multiplex are selected in such a manner that at least one other point of the transmission system, the difference between the bit times of any two channels of the multiplex is substantially equal to the clock period T,
   the method comprising a step of synchronously regenerating the signals of the channels of the multiplex at said at least one other point by synchronous modulation at the soliton clock frequency 1/T.

15. A transmission according to claim 14, wherein the wavelengths, $\lambda_1$ to $\lambda_n$, of the various channels of the multiplex are selected in such a manner that at said other point or at each of said other points, the difference $d_i$ between the bit times of a channel of wavelength $\lambda_i$ of the multiplex and of the first channel of wavelength $\lambda_1$ satisfies the relationship:

$$|d_i| < T/4.$$

16. A transmission method according to claim 12, wherein the wavelengths, $\lambda_i$ to $\lambda_n$, of the various channels of the multiplex are selected in such a manner that at said point or at each of said points, the difference $d_i$ between the bit times of a channel of the multiplex of wavelength $\lambda_i$ and of the first channel of wavelength $\lambda_1$ satisfies the relationship:

$$|d_i - k_i \cdot T/N| < T/4$$

where $k_i$ is an integer depending on the channel.

17. A transmission method according to claim 12, wherein the wavelengths, $\lambda_i$ to $\lambda_n$, of the various channels of the multiplex are selected in such a manner that at a plurality of other points of the transmission system that are spaced apart by an interval $Z_R$, the difference between the bit times of any two channels of the multiplex is substantially equal to the clock period T,
   the method comprising a plurality of steps of synchronously regenerating the signals of the multiplexed channels at each of said other points by synchronous modulation at the soliton clock frequency 1/T.

18. A transmission method according to claim 12, wherein the wavelengths, $\lambda_1$ to $\lambda_n$, of the various channels of the multiplex are selected in such a manner that for all of the wavelengths $\lambda_i$ of the multiplex, and for an interval $Z_R$, the difference $\Delta\tau_i$ between the slip per unit length on channel i and on the first channel satisfies the relationship:

$$(k_i \cdot T - T/4) < \Delta\tau_i \cdot Z_R < (k_i \cdot T + T/4)$$

where $k_i$ is an integer depending on the channel.

19. A transmission method according to claim 12, wherein the system is a system without dispersion slope compensation, and in that the wavelengths, $\lambda_1$ to $\lambda_n$, of the various channels of the multiplex are selected in such a manner that for an interval $Z_R$:

$$(k_i \cdot T - T/4) < D'_0 \cdot \Delta\lambda_{i1} \cdot (\Delta\lambda_{i1} + 2 \cdot \Delta\lambda_{10}) \cdot Z_R/2 < (k_i \cdot T + T/4)$$

where:
   $k_i$ is an integer depending on the channel;
   $D'_0$ is the dispersion slope;
   $\Delta\lambda_{i1}$ is the wavelength difference between channels i and 1; and
   $\Delta\lambda_{10}$ is the wavelength difference between the first channel and the wavelength $\lambda_0$ at which dispersion is zero.

20. A transmission method according to claim 12, wherein the system is a system with dispersion slope compensation, and in that the wavelengths, $\lambda_1$ to $\lambda_n$, of the various channels of the multiplex are selected in such a manner that for an interval $Z_R$:

$$(k_i \cdot T - T/4) < D_m \cdot \Delta\lambda_{i1} \cdot Z_R < (k_i \cdot T + T/4)$$

where:
   $k_i$ is an integer depending on the channel;
   $D_m$ is the mean dispersion slope for the wavelengths $\lambda_1$ to $\lambda_n$; and
   $\Delta\lambda_{i1}$ the wavelength difference between channels i and 1.

21. A method according to claim 12, wherein the synchronous modulation at the frequency N/T is intensity modulation with modulation depth selected to compensate the effects of modulation at the frequency N/T on modulation depth compared with a modulator operating at the frequency 1/T, said effects being expressed by the following formula:

$$IM_N = 20 \cdot \log(N) - 10 \cdot \log[N^2 - 1 + 10^{IM_1/10}]$$

where:
- $IM_N$ is the modulation depth of the modulator at the frequency N/T; and
- $IM_1$ is the modulation depth of the modulator at the frequency 1/T.

* * * * *